United States Patent Office 3,483,888
Patented Dec. 16, 1969

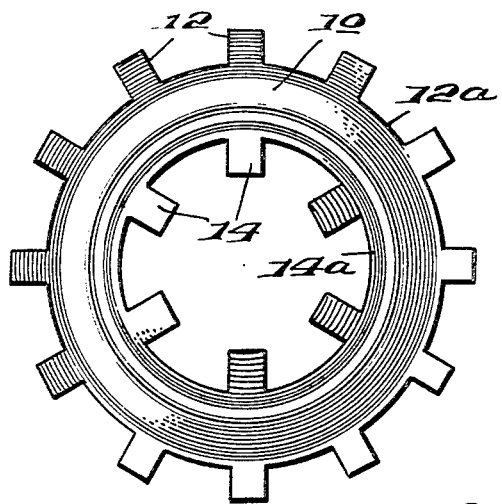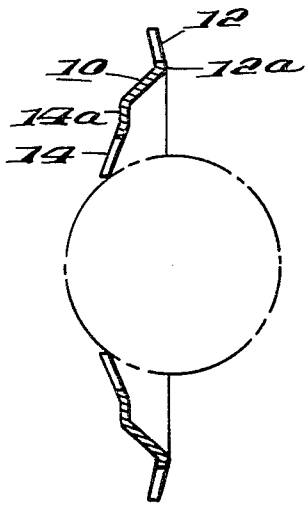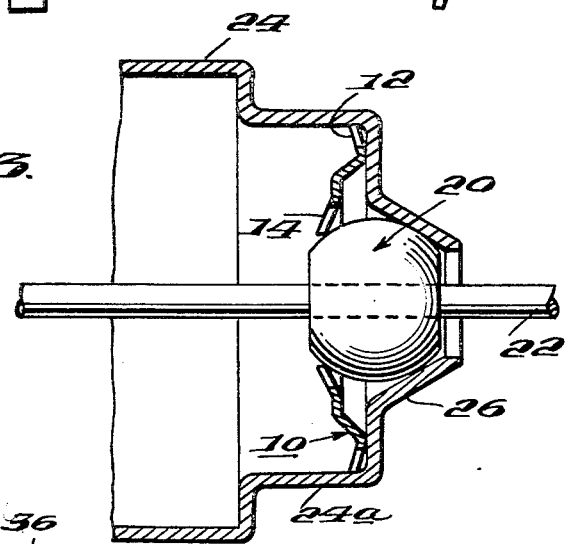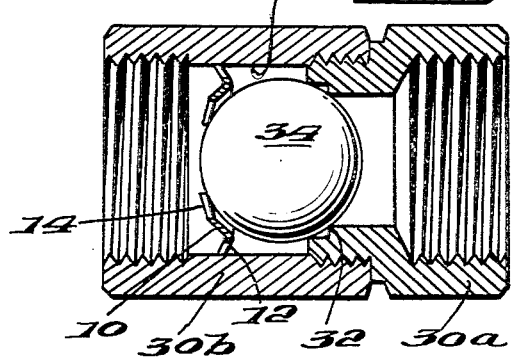

3,483,888
SELF-LOCKING RETAINING RINGS AND ASSEMBLIES EMPLOYING SAME
Hugo Wurzel, Bronx, N.Y., assignor to Waldes Kohinoor, Inc., Long Island City, N.Y., a corporation of New York
Filed Dec. 15, 1967, Ser. No. 690,870
Int. Cl. F16k 17/04, 51/00; F16l 29/00
U.S. Cl. 137—539                    10 Claims

ABSTRACT OF THE DISCLOSURE

A self-locking retaining ring combining features of the self-locking retaining ring of the prior art which enable it to self-lock itself to a bore-defining surface in a housing or like enclosure and features of a ring spring, i.e. a closed annulus provided with inwardly projecting prongs which abut against a part having full or substantially full spherical configuration such as that characterizing the ball of a ball joint or a ball check valve or against a partly spherical portion provided on a part to be retained having other than spherical configuration, which enable it to retain said part in a predetermined position within a bore.

---

This invention relates generally to self-locking retaining rings and to assemblies employing same, and more particularly to an improved self-locking retaining ring characterized by retaining prongs and to assemblies utilizing same wherein a part to be retained is so retained solely by its abutment with said prongs, as distinguished by its abutment with the ring body as with conventional retaining rings.

Among the several objects of the invention may be noted the provision of a practical and effective self-locking retaining ring characterized by the incorporation of part-retaining prongs; the provision of a self-locking retaining ring combining the self-locking capability of the self-locking retaining ring of the prior art with that of a so-called ring spring characterized by a closed ring body having radially inwardly projecting part-retaining prongs or fingers to retain a part or body within a bore; the provision of a self-locking retaining ring capable of functioning as a ring-type spring; the provision of a self-locking ring useful in forming an abutment for spherical or part-spherical parts; the provision of a self-locking retaining ring as last described which in practical effect extends the use of self-locking retaining rings to applications wherein it is desirable that the spherical or part-spherical part which is retained thereby be permitted to adjust itself in any direction along its spherical or part-spherical surface, with or without end play; and the provision of a novel design of self-locking retaining ring which extends the use of such rings to applications wherein the retained part, for example, the ball of a ball-type check valve, is permitted controlled movement axially with respect to the general plane of the ring between valve-open and valve-closed positions.

The above and other objects and features of advantage of the improved self-locking retaining ring and of applications employing same according to the present invention will appear from the following detailed description and accompanying illustrative drawings, wherein:

FIG. 1 is a front elevation of a preferred physical form of the improved self-locking retaining ring of the invention;

FIG. 2 is a section taken along line 2—2 of FIG. 1;

FIG. 3 is a fragmentary view, partly in section, of an assembly utilizing the ring shown in FIGS. 1 and 2 to retain a generally spherical part which illustratively is the ball of a ball joint assembly; and FIG. 4 is a view generally similar to FIG. 3 but illustrating the application of the self-locking retaining ring of the invention as the spring of a ball check valve.

Referring to the drawings in detail, a self-locking retaining ring characterized by part-retaining prongs as herein proposed comprises a closed ring or annulus 10, hereinafter referred to as the ring body, which is provided along its outer periphery with a plurality (twelve being illustrated) of integral, equally spaced and radially outwardly projecting spring prongs 12 and along its periphery with a plurality (six being shown) of integral, equally spaced, radially inwardly projecting prongs 14. As seen in FIG. 2, the ring body 10 has truncated or frusto-conical form in transverse section which substantially increases its resistance to distortion under the forces transmitted to it by its locking prongs 12, but it may be formed flat or planar for those applications wherein reinforcement of the ring body provided by its truncated form is not considered necessary.

As also seen in FIG. 2, the outwardly projecting prongs 12 extend from a small radial-height circular rim flange 12a running around the larger-diameter end of the truncated ring body and similarly the radially inwardly projecting prongs 14 extend from a small radial-height circular rim flange 14a formed on the smaller-diameter end of the truncated ring body. Said rim flanges serve two purposes, one being to facilitate ring production and the other to enable simple regulation of prong length and to allow easier calculation of the angle of inclination of both the outwardly and inwardly projecting prongs 12, 14, respectively.

The aforesaid outwardly projecting prongs 12 functions as spring locking prongs enabling the ring as a whole to self-lock itself to the bore-defining surface of a housing or similar ring enclosure to which it is assembled simply by being inserted in the bore to a desired axial position therealong. Accordingly, said prongs 12 are inclined by a small angle to the general plane of the ring body 10 in direction opposite that in which the ring is moved during the course of its assembly, and the free end edges of the prongs when unstressed, i.e. prior to ring assembly, lie on a circle of somewhat greater diameter than that of the circle of the housing bore, with the result that the inclination of the prongs increases during and following insertion of the ring in its bore.

It will be understood that the holding power of such a self-locking ring in the assembled state against thrusts exerted by the part retained thereby depends on several factors which are independent of one another. One such factor is the shear strength of the ring carrier, i.e. the housing, assuming of course that this material is not so hard as to make the locking prongs wholly ineffective. Another factor is the strength of the closed rim or body on which depends its resistance to distortion under the forces transmitted to it by its locking prongs in the direction of inclination of the latter. A third factor is the resistance of the locking prongs to buckling under load. It will be assumed that all of these factors will be taken into consideration when designing a ring for each particular application or assembly in which it is to be used.

The inclination of the inwardly projecting prongs 14 is again calculated to be such that the prongs will resist deflection when brought to their part-abutting position if no end play of said part is desired, or to enable said prongs to serve as loading prongs which at all times impart a yielding load or force on the part to be retained, for example, when the ring is employed as the spring of a ball check valve.

By reference to FIG. 2, it would seem that the length of the radially inwardly projecting prongs 14, i.e. the extent of their projection from the inner periphery of the ring body 10, is such that their free end edges lie on a circle having substantially less diameter than that of the spherical or part-spherical part to be retained. Also to be seen in FIG. 2 is that said inwardly directed part-retaining prongs 14 are inclined in the same direction to the general plane of the ring body 10 as are the outwardly projecting locking prongs 12.

Illustrative assemblies usefully employing a self-locking retaining ring as described are shown in FIGS. 3 and 4. Referring to FIG. 3 depicting a ball joint, reference numeral 20 designates the generally spherical ball member of the joint as being carried by a non-rotating spindle 22, and reference numeral 24 generally designates the ball-enclosing member of said joint. Illustratively, the ball is shown to be seated against the inner surface of a truncated-shaped extension 26 provided on the end wall of said enclosing member, against which it is held by the action of a self-locking retaining ring 10 as previously described. More particularly, the radial outwardly projecting locking prongs 12 of said ring serve to lock the ring as a whole to the inner surface of a cylindrical formation 24a with which the enclosing member is provided for the accommodation of said ring, in position such that the inner free ends of the radially inwardly projecting prongs 14 of said ring engage against the part-spherical surface portion of the spherical ball 20 which is disposed diametrically opposite the part-spherical surface portion thereof which seats against the inner surface of the aforesaid truncated formation 26 of the enclosing member.

Such an arrangement provides that the ball member of the joint may adjust itself along its spherical surface, i.e. may move to a relatively cocked position from that shown or may rotate to a limited degree, so as to take care of any misalignment in the assembly as a whole. Such adjustment of the ball may take place without end play in the event that the stiffness of the prongs 14 is such as to prevent end play, or with end play in case of the prongs having the calculated stiffness as permits limited end play.

From the above, it will be seen that the retaining ring 10 with its outwardly directed self-locking prongs 12 and its inwardly directed part-retaining prongs 14 combines the capability of the conventional self-locking retaining ring of the prior art to self-lock itself in place when assembled in a housing bore with the capability of a ring-type spring characterized by prongs or fingers extending radially inwardly from the inner perimeter of a generally circular ring body to retain a body or part against which said prongs or fingers bear.

Referring now to FIG. 4, such illustrates a self-locking retaining ring as herein contemplated applied as the loading spring of a ball check valve. In said view, reference numerals 30a, 30b designate inlet and outlet fittings, respectively, which together make up a valve body having a through bore and suitable means therein defining a valve seat 32. A ball-type check valve 34 is normally held seated against said seat by the inwardly projecting prongs 14 of a retaining ring 10–14 as previously described. To enable said ring to self-lock itself in ball-loading position, the bore of the fitting part 30b includes a smooth cylindrical bore portion 36 of larger diameter than each of said ball and seat and into which said ball projects, to the inner cylindrical surface of which the radially outwardly projecting prongs 12 of the ring lockingly engage.

It will be noted that in the FIG. 4 assembly as in the previously described FIG. 3 the inner free edges of the inwardly projecting retaining prongs 14 provided on the ring abut a part-spherical surface portion of the ball 34 which is opposite the part-spherical portion thereof which engages the valve seat 32. It will be understood further that by proper design of the ring said prongs 14 will impose a bias on the ball check as normally maintains said ball 34 tightly seated on said seat 32, but which will allow the ball to move a precalculated distance away from said seat should pressure of fluid on the inlet side exceed a predetermined value.

From the foregoing, it will be appreciated that a self-locking retaining ring provided with inwardly directed retaining prongs according to the invention may be usefully employed as the spring means of a ball check valve. That is to say, the ring when used in this application replaces not alone the conventional coil-type spring of the prior art, but also the spring retainer required to mount and position such a spring. Thus, the ring of the invention has the potential of not only replacing two parts by one but also of allowing considerable reduction in the length of the valve body.

It will be self-evident that the self-locking retaining ring 10–14 as herein proposed may also be used with advantage as a replacement for the springs conventionally employed in relief and poppet valves generally, for example, by forming the valve element thereof with a part-spherical surface corresponding to the portion of the ball check valve 34 which is engaged by the inwardly projecting ring prongs 14 of said ring. In such latter applications, assuming provision will be made for the self-locking prongs of the ring to act as described, the ring prongs will exert their loading effect on the relief or poppet valve element, just as they load the full spherical ball valve in the manner illustrated in FIG. 4.

While the retaining ring so far illustrated and described is of the internal form, that is to say, a ring which is adapted to be assembled in a bore of a housing-type carrier member, it is possible to incorporate the self-locking and part-retaining features thereof into a ring of the external form, that is, a ring which is adapted to self-lock itself to a shaft-type carrier member. In this latter ring, the locking prongs would project radially inwardly from the inner perimeter and the part-retaining prong would project radially outwardly from the outer perimeter of the ring body.

Without further analysis, it will be appreciated that a self-locking retaining ring characterized by part-retaining prongs as herein contemplated and disclosed, considered both per se and in typical assemblies utilizing same as described, achieves the objectives of the invention as set forth in the foregoing.

I claim:

1. A self-locking retaining ring for retaining a generally spherical body within a bore and against unwanted movement in the direction of the axis of said ring comprising: a closed ring body having integral spring prongs projecting radially outwardly from its outer periphery and integral prongs projecting radially inwardly from its inner periphery, said outwardly projecting prongs being inclined in one direction by a small angle from the general plane of the ring body and the free end edges thereof lying on a circle of diameter slightly greater than that of said bore for which the ring is designed whereby said prongs increase their inclination when the ring is assembled in said bore and the end edges thereof bite into the bore surface to a degree locking the ring body against movement in the direction towards which said prongs incline, said inwardly projecting prongs being inclined by a small angle from the ring body in the same direction as said outwardly projecting prongs and the free end edges thereof lying on a circle of substantially lesser diameter than that of said body to be retained and together serving as abutment means for said body.

2. A self-locking retaining means according to claim 1, wherein said inwardly projecting prongs have calculated stiffness which is such as to prevent any substantial end play of the generally spherical body abutting against the end edges thereof while permitting said body to adjust its angular position with respect to the axis of said ring.

3. A self-locking retaining means according to claim 1, wherein said inwardly projecting prongs have calculated stiffness which is such as to permit limited movement of the generally spherical body in the direction of the ring axis.

4. A self-locking retaining ring according to claim 1, wherein said ring body has frusto-conical formation.

5. A self-locking retaining ring according to claim 4, wherein the inner and outer perimeters of said frusto-conical ring body are formed with small radial-height rim flanges from which said prongs project.

6. An assembly comprising: means providing a cylindrical bore having therein seating means for a part to be retained, a generally spherical part having a surface portion adapted to seat on said seating means, and a self-locking retaining ring operative normally to retain said part seated on said seating means, said ring comprising a closed annular ring body having integral spring prongs projecting radially outwardly from its outer perimeter and integral prongs projecting radially inwardly from its inner perimeter, said outwardly projecting prongs being inclined by a small angle from the general plane of the ring body and in direction such that they lean away from said part to be retained and the free end edges thereof lying on a circle of diameter slightly greater than that of said cylindrical bore, whereby said ring self-locks itself to the bore surface responsive to its assembly in said bore, said inwardly projecting prongs being also inclined to the general plane of the ring body and in the same direction as said outwardly projecting prongs, the free end edges of said inwardly projecting prongs lying on a circle of lesser diameter than that of said spherical part and engaging a spherical surface portion of said part opposite that which seats on said seating means.

7. An assembly according to claim 6, wherein said inwardly projecting prongs have stiffness requisite to preventing any end play of the spherical part engaged thereby.

8. An assembly according to claim 6, wherein said inwardly projecting prongs have stiffness which is such as to permit limited movement of the part retained thereby in the direction of the ring body axis.

9. An assembly according to claim 6, wherein the cylindrical bore-providing means comprises the relatively fixed housing of a ball joint and the part to be retained comprises the generally spherical ball member of said joint; and wherein said outwardly projecting prongs are effective to lock said ring as a whole to the bore-defining surface of said housing in position such that its inwardly directed prongs bear against and are effective to retain the ball against any substantial end play while permitting the ball to adjust its angular position with respect to the axis of the ring body and housing.

10. An assembly according to claim 6, wherein said bore-providing means comprises a valve body having an axial bore provided with ball-valve seating means therealong and a smooth-surface bore portion of enlarged diameter disposed adjacent said seating means; wherein said generally spherical part comprises a ball-type check valve having a spherical surface portion adapted to seat on said seating means and a diametrically opposed spherical surface portion extending into said smooth-surface bore portion; and wherein said outwardly projecting prongs self-lock said ring as a whole to the bore-defining surface of said enlarged-diameter bore portion and in position such that the free ends of said inwardly projecting prongs bear against said diametrically opposed spherical surface portion of said ball.

References Cited

UNITED STATES PATENTS

| | | | |
|---|---|---|---|
| 947,751 | 1/1910 | Long et al. | 287—12 |
| 2,308,609 | 1/1943 | Koch | 308—72 |
| 2,451,216 | 10/1948 | Halfvarson | 287—21 |
| 2,922,682 | 1/1960 | Abel | 308—132 |
| 2,938,755 | 5/1960 | Lee et al. | 308—72 |
| 3,006,673 | 10/1961 | Swick | 287—87 |
| 3,302,662 | 2/1967 | Webb | 137—539 |
| 3,308,847 | 3/1967 | Umann | 137—505.42 X |
| 3,393,025 | 7/1968 | Jenkins | 308—132 |

FOREIGN PATENTS

| | | |
|---|---|---|
| 1,475,831 | 2/1967 | France. |
| 886,571 | 1/1962 | Great Britain. |
| 907,853 | 10/1962 | Great Britain. |

WILLIAM F. O'DEA, Primary Examiner

D. J. ZOBKIW, Assistant Examiner

U.S. Cl. X.R.

248—181; 267—1; 287—12, 21, 87; 308—72